United States Patent
Novak et al.

[11] Patent Number: 5,974,829
[45] Date of Patent: Nov. 2, 1999

[54] METHOD FOR CARBON DIOXIDE RECOVERY FROM A FEED STREAM

[75] Inventors: Richard A. Novak; Gary Lang, both of Naperville; Brad Hagstrom, Glen Ellyn; Enrique Lozano, La Grange, all of Ill.

[73] Assignee: Praxair Technology, Inc., Danbury, Conn.

[21] Appl. No.: 09/092,934

[22] Filed: Jun. 8, 1998

[51] Int. Cl.[6] .................................................. E25J 1/00
[52] U.S. Cl. ................................ 62/617; 62/616; 62/928
[58] Field of Search ............................. 62/606, 616, 617, 62/928, 48.2

[56] References Cited

U.S. PATENT DOCUMENTS

| | | | |
|---|---|---|---|
| 4,639,257 | 1/1987 | Duckett et al. | 55/16 |
| 4,639,262 | 1/1987 | Heichberger | 62/606 |
| 4,952,223 | 8/1990 | Kirshnamurthy et al. | 62/18 |
| 4,977,745 | 12/1990 | Heichberger | 62/10 |
| 4,990,168 | 2/1991 | Sauer et al. | 62/24 |
| 5,076,063 | 12/1991 | Kamegasawa et al. | 62/48.2 |
| 5,186,008 | 2/1993 | Appolonia et al. | 62/63 |

*Primary Examiner*—William Doerrler
*Attorney, Agent, or Firm*—Bharat C. Gandhi

[57] ABSTRACT

The method of the invention recovers $CO_2$ from an inlet cold feed stream containing a low concentration thereof, and includes the following steps. An inlet feed stream is passed through a heat exchanger, against a compressed flow of the inlet feed stream, to cool the compressed flow. The compressed flow is further cooled and compressed to a high pressure, fed to a distillation column and there converted into a vent gas including $CO_2$ and a high purity bottom liquid $CO_2$. A first portion of the bottom liquid $CO_2$ is expanded to achieve a first cooled liquid $CO_2$ refrigerant flow, which is then vaporized against the vent gas to recover condensed $CO_2$ therefrom. The condensed $CO_2$ is then reintroduced into the distillation column. A second portion of the bottom liquid $CO_2$ is expanded to achieve a second cooled liquid $CO_2$ refrigerant flow, which is then used to subcool the $CO_2$ product output.

18 Claims, 6 Drawing Sheets

METHOD FOR CARBON DIOXIDE RECOVERY FROM A FEED STREAM

FIELD OF THE INVENTION

This invention relates to a method for recovery of carbon dioxide ($CO_2$) from a feed stream which includes a relatively low $CO_2$ concentration and, more particularly, to such a method which recovers $CO_2$ for recycling through a refrigeration unit.

BACKGROUND OF THE INVENTION

In conventional freezing of food with $CO_2$, liquid $CO_2$ is obtained from a storage tank at about 0° F. and about 300 psig and is injected into a freezer. As the pressurized liquid $CO_2$ flashes down to atmospheric pressure, it forms a mixture of solid $CO_2$ ("dry ice") and cold $CO_2$ vapor. The sublimation of the solid $CO_2$ and the warming of the vapor $CO_2$ from the sublimation temperature (−109.3° F.) to the desired freezer temperature (usually between −100° F. and −50° F.) provide the refrigeration needed to freeze the food. The food to be frozen enters and exits the freezer continuously, and is moved through the freezer on a conveyor. After warming to the freezer temperature, the $CO_2$ vapor leaves the freezer through the entrance and exit openings, and sometimes also through an exhaust line.

Food freezing typically requires about a one to one (1:1) ratio by weight of liquid $CO_2$ to food. As a result, large amounts of $CO_2$ vapor are lost to the atmosphere by conventional freezing. For example, a single standard spiral freezer unit can consume 10,000 tons of $CO_2$ per year. The cost of $CO_2$ represents most of the freezing cost. Recovery and recycling of $CO_2$ from the freezer could substantially lower the cost of freezing food. Furthermore, recycling could produce environmental benefits, such as reduced $CO_2$ emissions to the atmosphere and reduced truck transportation of liquid $CO_2$.

Unfortunately, processes used in conventional merchant plants for liquefaction and purification of $CO_2$ from gas streams would be uneconomical for freezer recycle. Merchant liquid $CO_2$ is produced from industrial byproduct sources containing typically 98% $CO_2$ (all $CO_2$ concentrations are given in mole percentage, dry basis) and higher. In contrast, typical food freezers operate at $CO_2$ concentrations of 40–80%, due to air infiltration through the freezer openings. The $CO_2$ vapor exhaust is typically further diluted with room air to warm the exhaust and prevent ice build up in the exhaust system. Vent losses of $CO_2$ from conventional liquefaction and purification processes increase greatly as the concentration of $CO_2$ in the feed gas declines. These losses make the cost of conventional processes too high for economical use in recovering $CO_2$ from typical freezers.

Freezers may be modified to reduce air infiltration and to supply higher $CO_2$ concentrations to a $CO_2$ recycle system. However, even at 90% $CO_2$ concentration in the freezer, conventional $CO_2$ liquefaction and purification methods would suffer losses of about 29%, which are still too large to be economical.

A simple, economical, and reliable process is needed for the liquefaction and purification of $CO_2$ from vapor recovered during food freezing. To be economical, the process must have substantially lower losses of $CO_2$ than conventional methods.

A conventional process for liquid $CO_2$ production is shown in FIG. 1. A raw gas source 1 is obtained as an industrial byproduct, such as from an ammonia plant, petroleum refinery, or fermentation source. Raw gas characteristics vary, but for economical production using conventional methods, the $CO_2$ concentration is typically above 95%. Raw gas sources are typically obtained at ambient temperature or above, and are often saturated with water. For exemplary purposes, the raw gas source 1 in FIG. 1, is assumed to contain 98% $CO_2$ at a pressure of 20 psia and a temperature of 90° F. The gas passes through heat exchanger 2 and is chilled to 50° F. against ammonia refrigerant. As a result, water condenses out of the gas and is removed in separator 4.

Cooled gas stream 5 is compressed by compressor 6 to 75 psia, and the heat of compression is removed in exchanger 8. Gas stream 9 leaving exchanger 8 is cooled to 95° F., which allows separation of condensed water in separator 10. Gas stream 11 is compressed by compressor 12 to about 315 psia (stream 13), cooled in heat exchanger 14 to 50° F., and fed as stream 15 to separator 16 where condensed water is separated. Cooled gas stream 17 is treated by adsorbent driers 18 to remove further water to achieve a low dew point, typically about −80° F. The driers operate in swing mode, with one bed in operation while the other bed is being regenerated. Dry gas stream 19 is used to provide heat to the reboiler of $CO_2$ purification column 20. Dry gas stream 21 leaving the reboiler is now near the dew point for $CO_2$ condensation. The dry gas 21 is partially condensed at −5° F. against ammonia refrigerant in exchanger 22, providing a two-phase feed stream 23 for column 20.

Purification column 20 is a distillation column of well-known design to those skilled in the art. Typically, column 20 is a packed bed column, though other types of distillation column designs may be used. Liquid $CO_2$ is increasingly purified as it flows down the column, and exits at the column bottom as liquid stream 27 at high purity, typically at about 99.9% $CO_2$. Vapor stream 24 exits at the top of the column and contains all of the non-condensable portions of the raw gas feed, gases such as methane, hydrogen, nitrogen, etc. Some of the $CO_2$ content of this vent stream is condensed against ammonia refrigerant in exchanger 25 and the $CO_2$ liquid produced flows back into column 20 as reflux. The final vent stream 26 is released to the atmosphere.

Liquid $CO_2$ stream 27 is often subcooled to about −20° F., 305 psia, in exchanger 28 against ammonia refrigerant. This subcooling allows use of lower pressure storage vessels at production plants and minimizes vaporization of the liquid as it is pumped. After delivery to a customer site, the liquid $CO_2$ is stored as a saturated liquid at about 295–305 psig (310–320 psia), and 0.8–2.7° F. For simplicity, storage conditions at the customer site are characterized as 300 psig, 0° F. herein.

The varied characteristics of raw gas sources require many variations of the conventional process described above. Some of the separation stages for removal of water may not be needed, or the pressures and temperatures may differ from the example. Also, additional unit operations are often needed for removal of contaminants such as hydrocarbons or sulfur compounds. The refrigerant used is usually ammonia or cooling water, or a combination thereof, depending on the temperature level in a particular exchanger. In addition, other refrigerants have been used, such as hydrocarbons and chlorofluorocarbons.

Not shown in FIG. 1 is a companion utility process of ammonia refrigeration, typically supplying liquid ammonia at different pressure levels to provide refrigeration at temperatures between −25° F. and 100° F. The design of this process is well known in the art, and is widely used in $CO_2$ production and in many other industrial and commercial processes.

Conventional methods of $CO_2$ liquefaction, using ammonia refrigeration at $-25°$ F., suffer increasing $CO_2$ losses as the purity of the raw gas decreases. A typical conventional system can maintain a vent condenser temperature as low as $-20°$ F., assuming ammonia refrigeration at 1 psig, $-25°$ F. suction, and a $5°$ F. approach in the condenser. The $-20°$ F. vent condenser temperature produces a vent composition of 73% $CO_2$. For a typical merchant plant feed of 98% $CO_2$, this would limit losses to 5.5% of the feed $CO_2$ content, as shown by the $-20°$ F. temperature line in FIG. 2. However, if the feed were vapor recovered from a freezer at 90% $CO_2$, the conventional process would suffer vent losses of 30%, making the process uneconomical. Hence, these losses make conventional processes uneconomical for recycle of recovered vapor from food freezing with $CO_2$.

Losses of $CO_2$ in the vent condenser may be reduced by increasing column pressure or by reducing the condensing temperature. As cited in U.S. Pat. No. 4,952,223 to Kirshnamurthy et al., increasing the pressure has disadvantages, including increased power consumption, decreased product quality, and the potential for formation of an azeotrope between $CO_2$ and oxygen. Higher pressure would also increase the cost of the equipment. Decreasing the vent condenser temperature is a better solution.

FIG. 3 presents the vent loss (percent of the feed stream $CO_2$ content lost in the column vent stream) as a function of the vent condenser temperature, for the case of a 90% $CO_2$ feed stream (typical of vapor recovered from a freezer that is used as a feed for the invention disclosed below). As shown in FIG. 3, the vent condenser loss for a 90% $CO_2$ feed stream is 30% at a conventional condenser temperature of $-20°$ F., but only 8.3% at a reduced temperature of $-50°$ F. Loss rates of up to 10% should not prevent the system from achieving economical operation, and indeed are typical of many merchant $CO_2$ plants. The reduced loss rate achieved by a $-50°$ F. vent condenser temperature is also shown in FIG. 2 for other feed concentrations.

To achieve vent condenser temperatures below $-20°$ F. with conventional designs requires vacuum operation in the ammonia refrigeration system. Vacuum operation is undesirable, causing problems such as leakage of air into the ammonia system, larger vapor line sizes, higher power requirements, and lubrication problems. These problems increase equipment and operating costs and decrease reliability. Other refrigerants, such as chlorofluorocarbons, may be used instead of ammonia to achieve reduced vent temperatures. However, refrigeration systems employing these alternative refrigerants are more expensive, may have operational problems when employed for $CO_2$ liquefaction, and have environmental concerns.

Conventional $CO_2$ liquefaction methods have been applied, though without economic success, to recycle $CO_2$ in food freezing. Duron et al., "Reliquefies $CO_2$ For Cryogenic Freezing, Food Engineering", April 1972, p. 72–74, described a system developed for recovery, liquefaction, purification, and recycle of $CO_2$ in food freezing. In the described system, $CO_2$ gas was obtained from the freezer through ducts on the entrance and exit of a spiral freezer. A blower was used to transfer the gas to the recycle system. In the recycle system, the vapor was compressed, cooled, dried, treated for odor removal, condensed, and purified before returning to the freezer. Two parallel six-stage centrifugal compressors were used, with intercooling on each stage. The system used three mole sieve beds for drying and odor removal, and a four stage Freon refrigeration system. This recycle system was reported to cost $1 million in 1972.

There were several disadvantages to the Duron et al. system. The dual six-stage compressors and four-level refrigerant system were complex and expensive. The centrifugal compressors were limited in turndown and required anti-surge flow control. The estimated power requirement was very high, when compared with conventional $CO_2$ plant power requirements of less than 200 kWh/ton. There is no indication that means were used to reduce losses of $CO_2$ in the purification system.

U.S. Pat. No. 4,952,223 to Kirshnamurthy, et al., describes a process to recycle $CO_2$ from food freezing using pressure swing adsorption (PSA). The process may be used for feed streams containing about 35% to 98% $CO_2$. When used to recover $CO_2$ from food freezers, however, the expected feed $CO_2$ concentration is significantly less than 89% by volume and may be as low as 35% by volume. The patent states that commercial refrigeration units employing liquid $CO_2$ for freezing foods contaminate the liquid $CO_2$ with nitrogen and oxygen (air) to the extent that the spent $CO_2$ vapor may contain as much as 50% or more of the contaminants. In this process, vapor drawn from the freezer is sent down a recovery line by injection of warm, pressurized air. The vapor is compressed, cooled, dried, condensed, and purified by conventional techniques. The purification column vent is treated with a PSA unit. In the PSA unit, the $CO_2$ from the column vent is adsorbed onto a solid adsorbent. The $CO_2$ is recovered from the solid adsorbent, at low pressure, and the low pressure $CO_2$ stream from the PSA is recompressed with a vacuum pump and sent to the suction of the feed compressor. The PSA unit is used to reduce the very high vent loss that a conventional process would experience with such a low concentration feed gas.

Since the vapor from the freezer is further diluted with air before recovery, refrigeration content is wasted, and the injected air increases compression and purification costs. The system is complex, requiring multiple adsorbent beds operated in swing cycles, vacuum pumps, and extra compression to recover the low-pressure $CO_2$. These factors increase the cost and reduce the operating reliability of the system.

U.S. Pat. No. 5,186,008 to Appolonia et al., discloses a method to increase the $CO_2$ concentration in the vapor removed from a freezer for recovery, thus addressing one of the disadvantages of U.S. Pat. No. 4,952,223, above. Exhaust plenums are used on the entrance and exit of a spiral freezer, with the draw rate varied with injection rate of cryogen, to reduce air infiltration. A second blower is used to draw vapor for recovery from the freezer bottom, where the $CO_2$ concentration is substantially higher than at the top because of density differences. The mass flow of recovery vapor is controlled to be equal to the mass flow of injected cryogen times a constant (90% is given). This is done to avoid over or under pressure in the freezer, which would expel more than a minimum amount of $CO_2$, or would introduce too much air. The recovered vapor is to be recycled by the PSA process of U.S. Pat. No. 4,952,223.

Selective membranes may be used to reduce the loss of $CO_2$ in the purification column vent. U.S. Pat. No. 4,639,257 to Duckett et al. proposes treating the column vent from a conventional $CO_2$ process with a selective membrane. The vent is first heated, and then allowed to pass through a membrane unit where the $CO_2$ selectively permeates the membrane. The high purity, low pressure $CO_2$ permeate is then sent to the suction of the feed compressor for recovery. For low concentration feeds, a second membrane unit is proposed to increase the concentration of the feed prior to liquefaction and purification. U.S. Pat. No. 4,990,168 to Sauer et al. proposes a similar process, except that the vent stream is not heated prior to the membrane unit.

Both membrane processes suffer disadvantages. High pressures (400–415 psia) are required to feed gas to the membrane units, and the $CO_2$ permeate is obtained at low pressure (22 psia) requiring substantial recompression. Also, membrane units are expensive and may be subject to fouling by process contaminants.

While U.S. Pat. No. 4,990,168 teaches that it is not necessary to heat the vent stream going to the membrane, and higher selectivities are achieved, the low temperatures reduce the permeability of the membrane and increase the required surface area and expense.

U.S. Pat. No. 4,977,745 to Heichberger describes a process for production of liquid $CO_2$ from low purity sources using turbine expansion of the non-condensable impurities to provide refrigeration. The feed gas is cooled to remove water, compressed, dried, and partially condensed. The vapor from the condensation step, containing the impurities, is heated and expended in a multistage turbine expander. The cold turbine exhaust is used for refrigeration in the process, such as for the $CO_2$ condenser.

The Heichberger process is proposed for raw gas feeds containing less than 85% $CO_2$, particularly flue gas containing less than 50% $CO_2$. Feed gas with more than 85% $CO_2$ may not contain enough impurities to provide sufficient refrigeration upon expansion. While it is possible to operate food freezers at less than 50% $CO_2$ concentration, such low $CO_2$ concentrations in the freezer indicate air infiltration, which reduces freezer efficiency. Also, the capacity of freezer recovery units would be small compared to merchant $CO_2$ production plants, and the cost of turbine expansion units taught in the Heichberger patent are high for such small plants. Furthermore, Brayton cycles as used in the Heichberger patent required much more energy than the Rankin cycles used in conventional merchant $CO_2$ liquefaction. These factors tend to make the Heichberger process uneconomical for $CO_2$ recovery from freezers.

SUMMARY OF THE INVENTION

The method of the invention is a modification of the conventional $CO_2$ production process that reduces column vent losses using $CO_2$ refrigerant and provides increased economic savings through subcooling of the liquid $CO_2$ recycled to the freezer. The method of the invention utilizes innovations which include the economical use of refrigeration available in the feed stream through heat interchange, means for removal of odors and bacteria, and fully automated and unattended operation. These are achieved with a few additional standard equipment items relative to the conventional merchant plant process. The modified process does not involve expensive additional unit operations, such as membrane or PSA units.

The method of the invention recovers $CO_2$ from an inlet cold feed stream containing a low concentration thereof, and includes the following steps. An inlet feed stream is passed through a heat exchanger, against a compressed flow of the inlet feed stream, to cool the compressed flow. The compressed flow is further cooled and compressed to a high pressure, partially condensed, fed to a distillation column and there converted into a vent gas including $CO_2$ and a high purity bottom liquid $CO_2$. A first portion of the bottom liquid $CO_2$ is expanded to achieve a first cooled liquid $CO_2$ refrigerant flow, which is vaporized against the vent gas to recover condensed $CO_2$ therefrom, and the condensed $CO_2$ is then reintroduced into the distillation column. A second portion of the bottom liquid $CO_2$ is expanded to achieve a second cooled liquid $CO_2$ refrigerant flow, which is used to subcool the $CO_2$ product output.

DETAILED DESCRIPTION OF THE INVENTION

Figure 4:
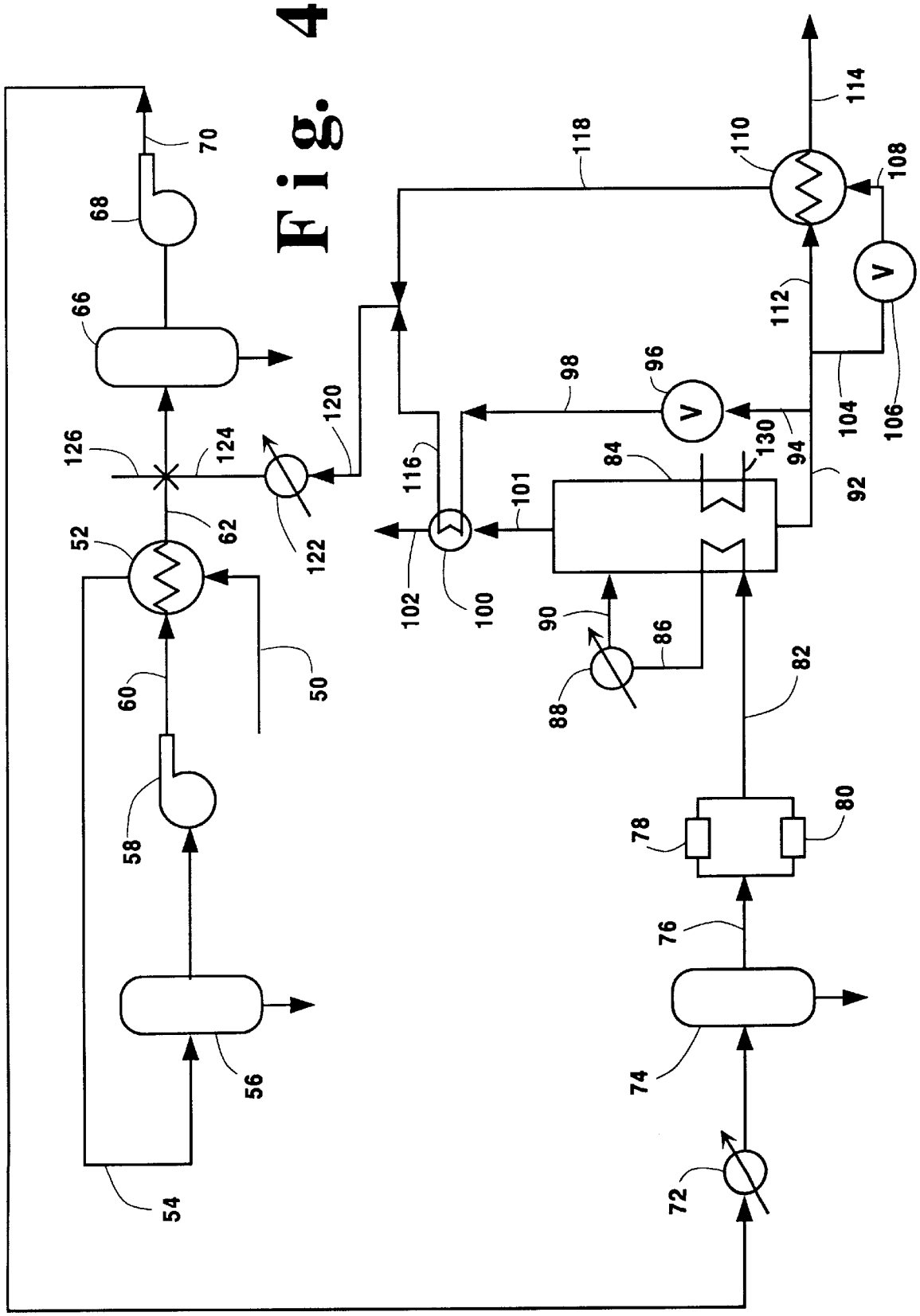
FIG. 4 is a system diagram of a $CO_2$ recovery plant incorporating the invention.

A process for $CO_2$ liquefaction, purification, and recycle which incorporates the invention is shown in FIG. 4. A feed gas stream 50 is obtained from a low-purity $CO_2$ source, such as vapor recovered from a food freezer that uses liquid $CO_2$ as the refrigerant. Typical conditions for stream 50 from a food freezer would be $-80°$ F., 19 psia, 90% $CO_2$ (dry basis), and containing up to 2.5% (by mole) water. The water is present predominantly as entrained ice crystals.

The cold vapor feed stream 50 passes through a heat exchanger 52 where it is warmed to above 32° F., preferably to about 40° F. This is done to melt any entrained ice crystals in the feed stream, and also to warm the stream to typical compressor suction temperatures. Solid ice crystals and unusually low suction temperatures could adversely affect compressor operation.

The warmed vapor stream 54 flows through separator 56 to remove liquid water, and then into compressor 58 where it is compressed to about 86 psia. The discharge pressure of compressor 58 is chosen to be slightly above the triple point pressure of $CO_2$ (75.1 psia) which facilitates the use of $CO_2$ as a refrigerant (described below). Compressor discharge stream 60, warmed by heat of compression, passes through heat exchanger 52 where it warms the incoming feed vapor stream 50, and in the process is itself cooled to about 40° F. In this way, the useful refrigeration content of the feed gas is captured, avoiding a further load on the refrigeration and cooling system. Note that no separate heat source is needed to melt the ice crystals in the feed, and a single exchanger is used for both feed preheating and compressor aftercooling.

The cooled compressor discharge 62 combines with a warmed vapor from the $CO_2$ refrigerant stream 124 and enters separator 66, where liquid water is removed. The temperature of gas entering separator 66 should be as cold as possible to condense as much water as possible, but should remain above 32° F. to avoid ice formation. The flow is then compressed in compressor 68 to a discharge pressure of about 323 psia which is chosen to be slightly above the desired product pressure of 315 psia, allowing for pressure drop in the equipment. The product pressure is set at 315 psia to be the same as standard merchant liquid $CO_2$ storage and supply pressures, so that the recycled liquid may be easily combined with merchant liquid for supply to the freezer.

Compressor discharge stream 70 is cooled in exchanger 72 to about 50° F. and passes through separator 74 to remove liquid water. Separator 74 is also designed to remove oil (introduced into the gas stream by the compressors). The resulting stream 76 enters one of the two drier beds 78, 80 for removal of water. Drier beds 78, 80 contain a solid adsorbent for removal of water. The design and operation of adsorbent driers for the removal of moisture from $CO_2$ streams is well known in the art.

Drier beds 78, 80 also contain a quantity of activated carbon to remove other contaminants from the recycled $CO_2$. The other contaminants may include residual oil or volatile compounds from the food in the freezer (such as oils or aromas). A filter on the outlet of the drier beds is used to prevent entrainment of particulates from the driers. Additionally, that filter or a second filter may be fitted with a suitable pore size (0.2 micron) element to remove bacteria from the gas flow, if bacterial contamination is present in the vapor recovered from the freezer. Typically, bacteria are larger than 0.2 microns in size, so that filters of that pore size are commonly used to insure removal of bacteria from process streams.

Dry gas stream 82 passes through the reboiler of a distillation column 84 where it gives up its sensible heat and is cooled to near its dew point for $CO_2$ condensation. The resulting stream 86 is partially condensed against ammonia refrigerant at about $-25°$ F. in exchanger 88. The ammonia refrigerant level of about 16 psia, $-25°$ F., is chosen to maintain the ammonia compressor suction pressure above ambient pressure, to avoid operational problems with the ammonia system. The partially condensed stream 90, at about $-14°$ F., is then fed to column 84, operating at about 316 psia. In the preferred embodiment, distillation column 84 is a packed bed column.

Liquid $CO_2$ is increasingly purified as it flows down through column 84, exiting as column bottoms 92 at high purity. To obtain $CO_2$ refrigerant, a portion 94 of the column bottoms flows through valve 96 to produce a low pressure liquid and vapor $CO_2$ stream 98 at about 86 psia, $-63°$ F. The $CO_2$ refrigerant stream 98 pressure coincides with the discharge pressure of compressor 58 and the suction pressure of compressor 68.

The pressure of stream 98 is chosen to be slightly above the triple point pressure of $CO_2$ (75.1 psia). This condition is chosen to avoid the formation of solid $CO_2$, "dry ice", which could adversely affect the operation of the equipment. The $CO_2$ refrigerant pressure should be as low as practical, since lower pressures will achieve lower temperatures of the $CO_2$ refrigerant, and correspondingly lower loss of $CO_2$ from the vent condenser 100. However, the pressure should not fall below a limit set above the triple point pressure to maintain control of the pressure above the triple point.

The $CO_2$ refrigerant stream 98 passes through a vent condenser 100 where the liquid portion of the $CO_2$ refrigerant vaporizes, cooling the column vent gas stream 101 to about $-50°$ F. The cooling of the column vent gas stream 101 causes vapor to condense, forming a liquid which is enriched in $CO_2$ concentration compared with the vent vapor. The condensed liquid flows back into column 84 as reflux. The final vent stream 102, depleted in $CO_2$ content, is either released to the atmosphere directly or used as drier regeneration gas before release.

A further portion 104 of the column bottoms 92 is allowed to flow through valve 106 to produce a low pressure liquid and vapor $CO_2$ stream 108 at about 86 psia, $-63°$ F. Carbon dioxide refrigerant stream 108 flows through exchanger 110, it absorbs heat, causing the liquid portion of the refrigerant to boil and form vapor. This subcools the remaining portion 112 of the column bottoms, producing the final liquid $CO_2$ product stream 114 at about $-50°$ F., 315 psia.

Carbon dioxide refrigerant vapors 116 and 118 leave exchangers 100 and 110 at about $-63°$ F. (the saturation temperature of the $CO_2$ refrigerant). The exchangers may alternatively be designed to achieve warmer exit temperatures for the $CO_2$ refrigerant, to use some of the sensible refrigeration content of the stream if desired. The $CO_2$ refrigerant streams are combined in stream 120, then heated in exchanger 122 to about $60°$ F. The source of heat in exchanger 122 can be the gas discharge from the ammonia compressor, which can be cooled from the discharge temperature of about $160°$ F. to near its saturation temperature of $100°$ F. by this exchange. In this way, the sensible refrigeration potential of the $CO_2$ refrigerant vapor is used, and the load on the ammonia condensers is reduced. The warmed $CO_2$ gas 124 is then combined with the flow going to the suction of the second stage of $CO_2$ compression 68. If $CO_2$ from storage is used for drier regeneration, regeneration flow 126 may also be combined and sent to the suction of compressor 68.

Additional heat may be used for the purification column reboiler by subcooling ammonia condensate in a separate set of reboiler tubes 130. This allows product purity to be achieved with a smaller and less expensive column 84 than if reboiler heat were limited to the column feed stream. It also provides operational flexibility in adjusting boil-up rate to achieve required product purity.

The method of the invention is fully automated by use of a programmable logic controller (not shown). The system starts automatically when vapor is recovered from the freezer, adjusts itself during operation to variations in the recovered gas flow conditions, and shuts down automatically when the flow of recovery gas from the freezer is interrupted. Also, automated control improves the suitability for installation at food freezing facilities.

Net energy consumption per ton of liquid $CO_2$ recycled is about 210 kWh/ton for the present invention (for a 90% $CO_2$ feed stream), which is significantly less than the 460 kWh/ton estimated for the prior art system described in Duron et al. discussed above. The estimated capital cost of the proposed system is also significantly less than that reported by Duron et al. There are several factors that lead to the economic advantage of the invention. First, the system employs equipment of standard design that is widely used in $CO_2$ production plants. Second, $CO_2$ refrigerant can efficiently achieve vent condenser temperatures approaching $-69.9°$ F. (the triple point temperature of $CO_2$) without requiring vacuum operation. Third, the process employs both $CO_2$ refrigerant and ammonia refrigerant in the temperature ranges where they are best suited and most efficient. Finally, the process makes efficient use of energy through heat interchange between process streams; for example, the refrigeration content of the freezer vapor is not wasted, but is used to provide aftercooling for the first stage of $CO_2$ compression.

The method of the invention can operate over a range of feed gas conditions. For example, the process can operate at lower or higher feed $CO_2$ concentrations than the 90% $CO_2$ concentration described here. When the feed $CO_2$ concentration decreases, however, several consequences occur: the $CO_2$ loss from the column vent 102 increases, the fraction of freezer demand met by recycled liquid $CO_2$ decreases, the cost per unit of recycled $CO_2$ increases, and the economic savings to the entire freezer operation decreases. The preferred range of feed $CO_2$ concentration is about 85–100%.

The temperature of the feed stream can vary, depending on the temperature of freezer operation. Typical freezer temperatures are in the range of about −110° F. to 0° F.

The flow rate of vapor recovered from the freezer may vary over a wide range due to different operating modes of the freezer, and depends on the type and size of the equipment selected. In the preferred embodiment of the invention, the compressors used are screw compressors, which can operate over a wide flow range, typically a 10:1 ratio of maximum to minimum flow. Typically, the compressor capacity is chosen to provide the desired balance of efficiency and operational flexibility for the expected flow rates.

Figure 5:
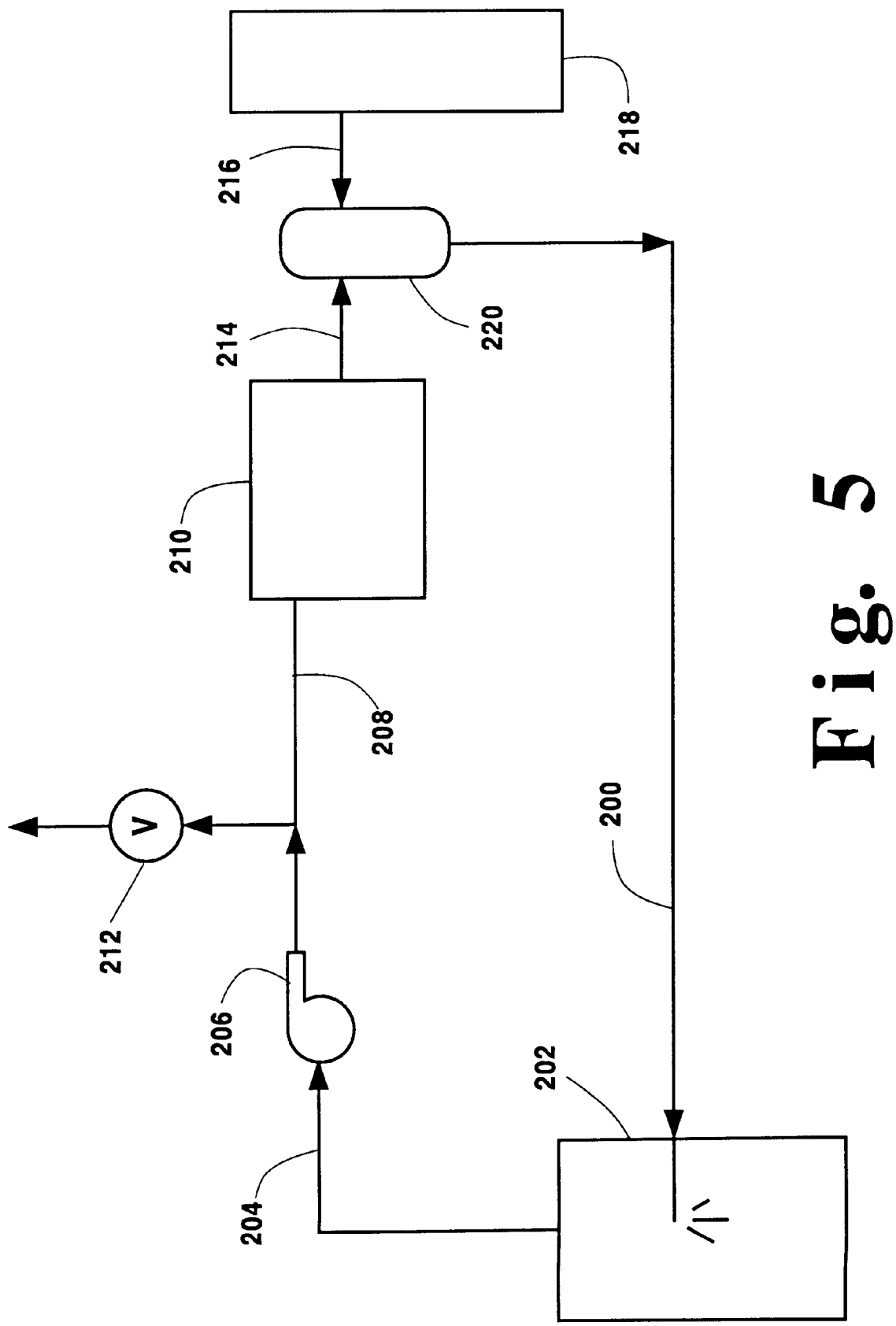
FIG. 5 is a system diagram of the $CO_2$ recovery plant of FIG. 4 when used in combination with a refrigeration unit.

An embodiment of the present invention, used for recycle of $CO_2$ from a food freezer, combined with subcooling of the liquid cryogen, is shown in FIG. 5. Liquid $CO_2$ 200 is introduced into freezer 202 through spray valves and other methods known in the art. A portion 204 of the freezer vapor is removed from freezer 202 by use of a blower 206 and sent through a pipe 208 to $CO_2$ recycle system 210. Recycle system 210 embodies the system shown in FIG. 4. A valve 212 may be opened or closed to vent the freezer vapor to atmosphere if it is not suitable for recycle, or if there is excess vapor available beyond the capacity of the recycle system 210. Vapor may not be suitable for recycling if the concentration of $CO_2$ is too low for proper operation of the recycle system.

Recycled liquid $CO_2$ 214 produced by the recycle system 210 is combined with a make-up stream of merchant liquid $CO_2$ 216 obtained from bulk storage tank 218. In one preferred embodiment, the recycled liquid and the make-up liquid are both subcooled at −50° F. and 300 psig, and the storage system 218 is a subcooled storage system. The flows of recycle liquid and make-up liquid must be controlled to supply the required flow of liquid $CO_2$ 200 to freezer 202. One means of achieving this is to allow the recycle liquid 214 to flow into a tank 220, and to vary the flow of make-up liquid 216 into tank 220 to maintain a constant level in tank 220. This also blends the two liquid streams to achieve a uniform composition in the liquid supplied to freezer 202. Other methods of combining make-up liquid with recycled liquid can be used. For example, the make-up liquid can be introduced at some point in $CO_2$ recycle process 210, or the recycle liquid 214 can flow into the storage tank 218.

Embodiment Modifications

The system design described above may be modified to use different sources of gas for the regeneration of the adsorbent driers. Column vent gas 102 from column 84 (FIG. 4) may be heated and sent to drier beds 78 or 80 to regenerate the adsorbent in the beds. The regeneration gas heats the solid adsorbent and carries away the moisture driven off the bed. For example, if the concentration of $CO_2$ in the recovered freezer vapor is below about 95%, then the flow of column vent gas would be sufficient for its use as drier regeneration gas. If the feed $CO_2$ concentration is above about 95%, then the vent gas flow will be insufficient to fully regenerate the drier beds. In that case, liquid $CO_2$ from bulk storage can be vaporized to supplement or replace the vent gas for regeneration. Alternatively, other sources of dry $CO_2$ vapor, such as $CO_2$ refrigerant vapor, may be used for regeneration.

If vent gas is used for drier regeneration, it is released to the atmosphere so that the non-condensable gases (nitrogen, oxygen, etc.) are removed from the process. If $CO_2$ vapor is used for regeneration, it can then be either released to the atmosphere, or recycled to the compression steps to be recovered.

The design may be modified to achieve the most economical design, given the type of equipment designs commonly available for different capacities. For example, a single compound $CO_2$ compressor may be used for the two stages of $CO_2$ compression, rather than using two separate compressors. The single compressor should be designed for the introduction of streams at intermediate pressure, such as $CO_2$ refrigerant stream 124 and regeneration gas 126 of FIG. 4. In this embodiment, heat exchanger 52 is used to cool compressor discharge stream 70, and separator 66 is eliminated.

Different compressor designs may be used, such as oil flooded screw, oil free screw, reciprocating, or centrifugal compressors. The design of compressor equipment suitable for this process is well known in the art.

Heat exchange may also be done in stages. For example, the second stage aftercooler heat exchanger 72 in FIG. 4 may be two units, one cooled by water or ammonia condensate at about 100° F., and the second cooled by low pressure ammonia at either about 40° F. or −25° F. Other heat transfer fluids and systems may be used where appropriate, such as cooling tower water, ethylene glycol, propylene glycol, brines, chlorofluorocarbons, hydrocarbons, etc., to provide cooling or heating as required. In addition, different pairs of process streams may be chosen for heat exchange. For example, the $CO_2$ refrigerant stream may be heated, before recycling to the $CO_2$ compressor, using a heat source other than the ammonia compressor discharge stream, such as the $CO_2$ compressor discharge, the column feed, ammonia condensate, etc. Other variations are possible and will be apparent to those skilled in the art, depending on the desired capacity, site conditions, available equipment, and economic factors.

The design of the system may be varied to achieve different purities of recycled liquid $CO_2$. For example, purification column 84 may be designed to achieve high purity $CO_2$ equivalent to merchant grade liquid $CO_2$. Alternatively, the design of the process may be altered to produce less pure liquid $CO_2$ if that meets the requirements of the application, and if it achieves further economic savings. One way in which this modification may be achieved is to use less packing height (fewer equilibrium stages of separation) in a distillation column to lower the product purity and reduce the column cost.

The design of the column vent condenser 100 in FIG. 4 may also be varied to achieve optimum system economics. The design condensation temperature may be varied from as warm as about −10° F. (which is in the range employed in conventional designs using ammonia refrigerant) to as cold as about −69.9° F. (the triple point of $CO_2$). In the examples given herein, the vent stream is cooled to −50° F. by using $CO_2$ refrigerant at −63° F., with a 13° F. approach temperature in vent condenser heat exchanger 100. The $CO_2$ refrigerant temperature of −63° F. results from the decision to set the refrigerant pressure at 86 psia, or about 10 psi above the triple point pressure of 75 psia. A 10 psi increment above the triple point is chosen to avoid the possibility of solids formation, which may occur if the pressure falls to the triple point or below. The formation of solids in the $CO_2$ refrigerant may clog the equipment. However, the increment between the $CO_2$ refrigerant pressure and the triple point pressure may be more or less than 10 psi, depending on the equipment designs used and on operating experience.

Figure 1:
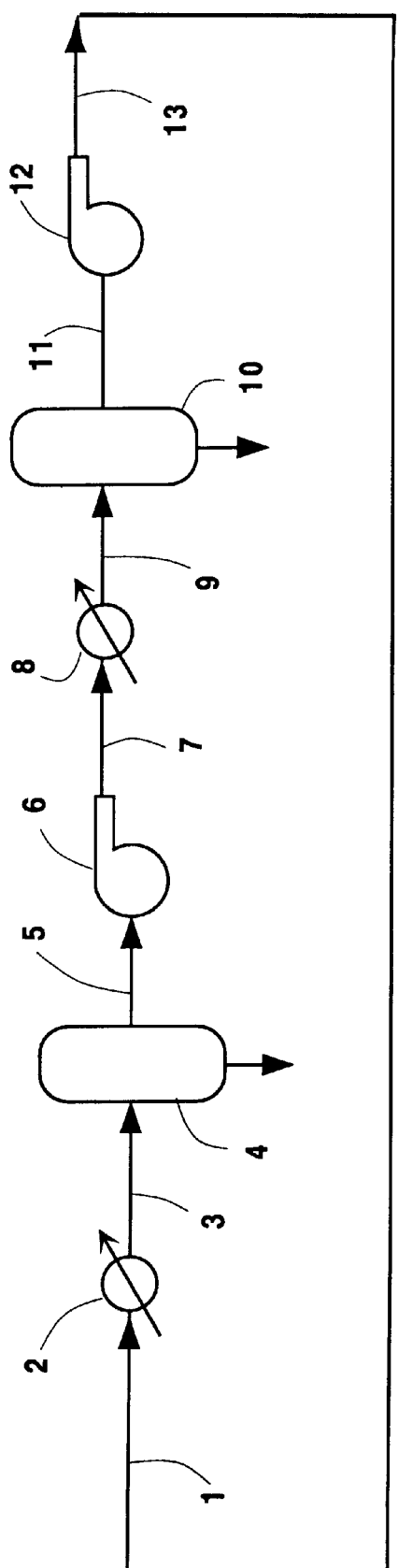
FIG. 1 is a system diagram of a prior art $CO_2$ recovery plant.
Figure 1:
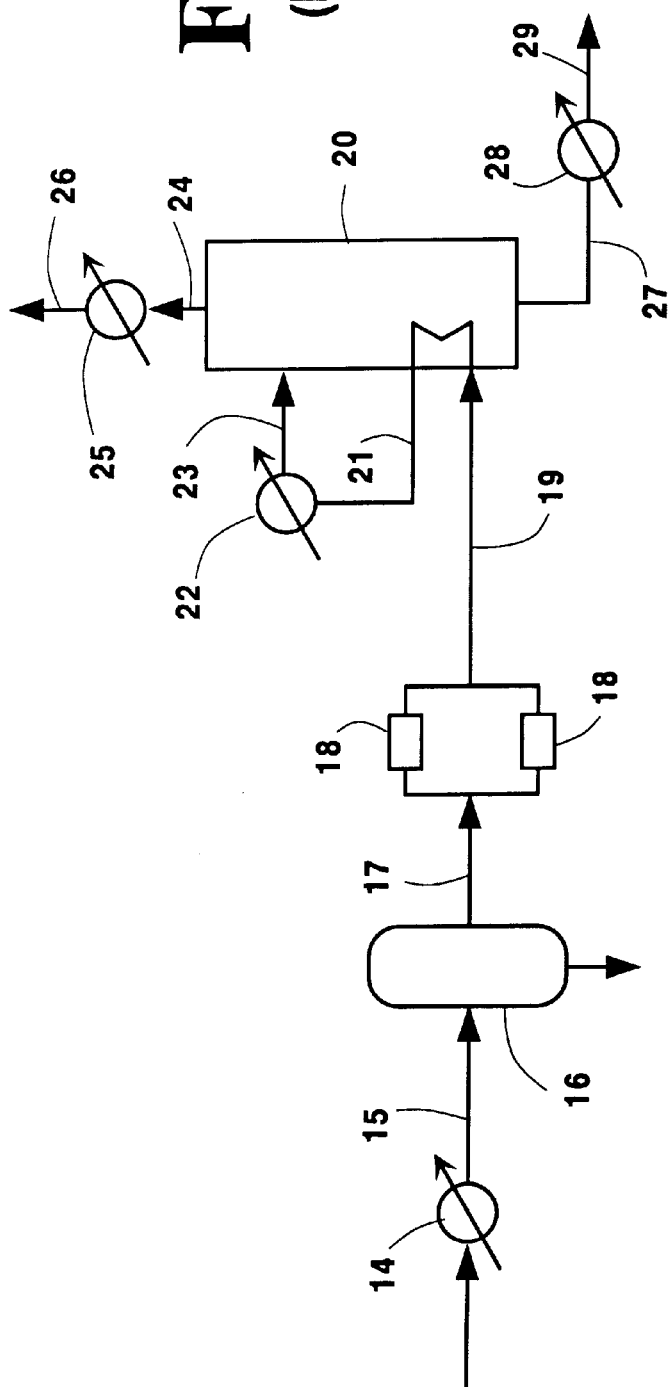
Figure 2:
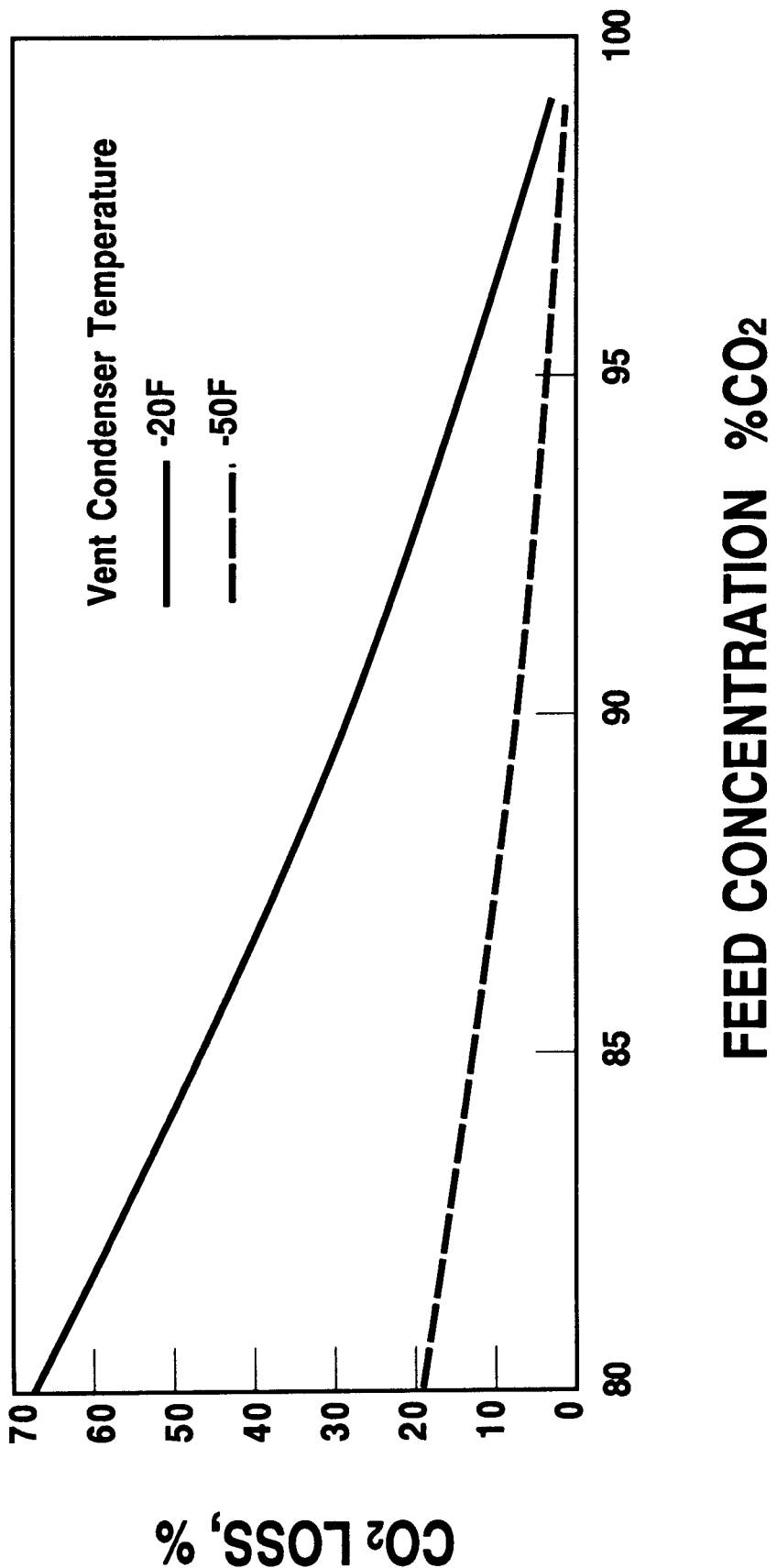
FIG. 2 is a plot of $CO_2$ column vent loss versus feed concentration at vent condenser temperatures of $-20°$ F. for the prior art plant of FIG. 1 and $-50°$ F. for the invention of FIG. 4.
Figure 3:
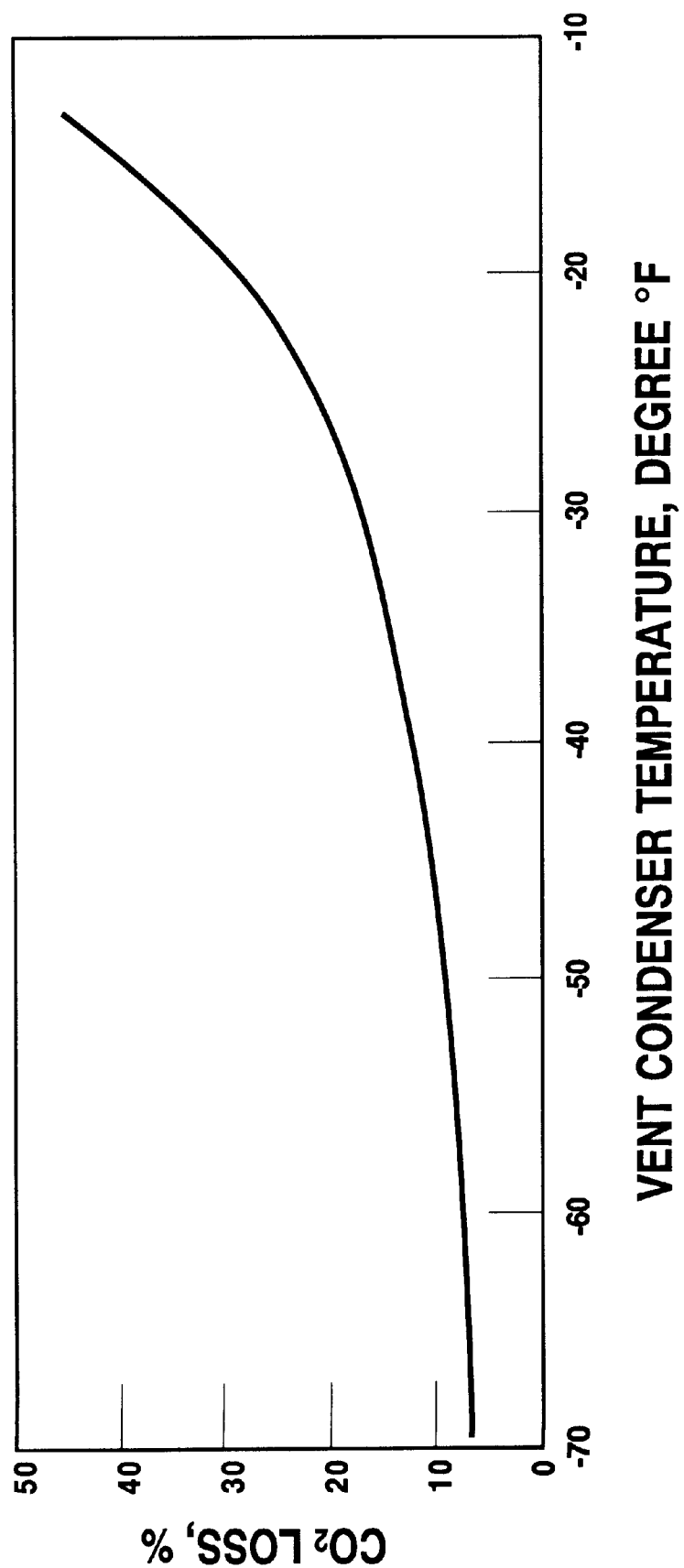
FIG. 3 is a plot of $CO_2$ column vent loss versus vent condenser temperature for a feed of 90% $CO_2$.

In addition, vent condenser 100 may be designed to operate at a closer approach temperature than the 13° F. used in the examples herein. The closer the approach temperature, the more heat transfer area is required, and the higher is the expense of the equipment. Typically, minimum design approach temperatures of 5° F. to 20° F. are employed, but the final value used is often determined so as to achieve an economic optimum. It is advantageous to operate close to the triple point and at low vent temperatures, as long as reliable operation is maintained, since this decreases the loss of $CO_2$ in the vent stream. For example, if the $CO_2$ refrigerant stream were maintained at a pressure to achieve a −65° F. refrigerant temperature, and the approach temperature in the exchanger was 5° F., a vent temperature of −60° F. is achieved. As shown in FIG. 3, this reduces $CO_2$ loss to 5.98% (for a 90% $CO_2$ feed), compared to a loss of 8.35% for a −50° F. vent. The optimum selection of refrigerant temperature and pressure, vent conditions, and vent condenser design will be apparent to those skilled in the art.

Different configurations are possible for the use of $CO_2$ refrigerant to achieve incremental cost or operational improvements. For example, in FIG. 4, $CO_2$ refrigerant stream 98 may be directed first through the vent condenser 100, and then to the product subcooler 110, before being sent to heat exchanger 122. In this way, a single $CO_2$ refrigerant circuit is used instead of two separate flows, and the second let down valve 106 can be eliminated.

A further embodiment uses both ammonia refrigerant and $CO_2$ refrigerant in vent condenser 100 or product subcooler 110. Ammonia refrigerant at about −25° F. may be used to provide cooling of the vent stream to about −15° F. to −20° F., and then the $CO_2$ refrigerant can be used to further lower the process stream temperature to about −50° F. or less. This alternative can reduce the required flow of $CO_2$ refrigerant, thereby reducing $CO_2$ compression capital and operating costs, and also reducing the size and cost of the heat exchangers, vessels, and column between the $CO_2$ compressors and the product subcooler. However, this design also increases the required size and cost of the ammonia refrigeration system, and may require additional heat exchangers.

The extent of product subcooling may be increased by the use of $CO_2$ refrigerant at lower temperatures and/or by reducing the minimum design approach temperature in product subcooler 110. Varying amounts of subcooling may be achieved by cooling the product to temperatures between about 0° F. to about −69.9° F. (the triple point temperature). The refrigeration content of the liquid $CO_2$ increases as the product temperature decreases. Therefore, as the product temperature decreases, less liquid $CO_2$ is needed to provide a given amount of required refrigeration in the food freezer, which can be an economic advantage. As in the case of the vent condenser design, the selection of the $CO_2$ refrigerant temperature, product temperature, and subcooler design will be made to achieve optimum system economics while maintaining reliable operation.

Product subcooler 110 may also be designed to subcool not only the recycled liquid, but also any make up liquid obtained from the bulk storage tank. This embodiment allows the use of conventional bulk merchant liquid $CO_2$ storage systems, instead of the more expensive subcooled storage systems. In this case, however, the $CO_2$ equipment as shown in FIG. 4 needs to have sufficient capacity and design for the higher flow rate of $CO_2$ refrigerant which increases the cost of that portion of the system. This type of system may also require changes to the freezer equipment and operation. For example, the freezer may need to operate sometimes on conventional 0° F. liquid $CO_2$ when the recycle equipment is not operating due to maintenance or repair, and other times on subcooled liquid $CO_2$.

A further embodiment reduces or eliminates the amount of product subcooling, and produces liquid $CO_2$ product at about 300 psig, 0° F. (equivalent to typical merchant liquid $CO_2$). This reduces the amount of refrigerant $CO_2$ required, and hence capital and operating costs of the recycle system. A conventional storage system can be used instead of a subcooled storage system. However, the freezer liquid $CO_2$ requirements are about 20% higher for liquid supplied at 0° F. versus liquid supplied at −50° F. (subcooled). This higher requirement applies to both the recycled liquid and any make-up liquid obtained from bulk storage of merchant product. Because of the higher liquid $CO_2$ requirement, this alternative results in higher total costs for food freezing when compared with the supply of subcooled liquid.

DISTINCTIONS OF INVENTION FROM PRIOR ART

The prior art teaches that the methods employed in the present invention would not be expected to be successful. For example, U.S. Pat. No. 4,639,257 states that the high percentage of $CO_2$ in the vent gas from refrigerated vent condensers is due to equilibrium conditions in the gas mixture at the usual condenser operating conditions. In the given example therein, for the recovery of $CO_2$ from mixtures containing light hydrocarbons, the usual condenser pressure of 290 psia and temperature of −22° F. lead to vapor concentrations around 60–70% $CO_2$. The '257 patent also states that this situation is not substantially improved by operation at lower temperatures, which may lead to azeotrope formation and/or solidification of $CO_2$.

U.S. Pat. No. 4,990,168 states that a conventional 200 ton per day plant with high $CO_2$ concentration feed has a vent stream of about 75% $CO_{2_1}$ causing a loss of 10–15% of the feed $CO_2$. In contrast, the present invention achieves much lower vent $CO_2$ concentrations and lower vent losses of $CO_2$. For example, with the present invention a vent concentration of only 43% $CO_2$ is achieved at a −50° F. vent temperature. This low vent temperature is achieved by using low temperature $CO_2$ refrigerant at −63° F. and a 13° F. approach temperature in the vent condenser.

Using a low temperature refrigerant reduces vent losses from above 30% of the feed content for a conventional system (−20° F. vent condenser) to only 8% (for a −50° F. vent) when the present invention is used to treat a 90% $CO_2$ feed. Losses may be further reduced by using lower $CO_2$ refrigerant temperatures (as low as the triple point of −69.9° F.) and by designing the vent condenser for closer approach temperatures.

The prior art teaches that the vapor to be recovered from freezers is of low purity and cannot economically be recovered by methods as taught here. For example, U.S. Pat. No. 4,952,223 states that vapor in freezers is significantly less than 89% $CO_2$, and probably about 50% $CO_2$. Although U.S. Pat. No. 5,186,008 proposes a method for increasing the $CO_2$ concentration in the freezer to higher levels, the patent still proposes to use the PSA system of U.S. Pat. No. 4,952,223 for liquefaction and purification, thereby suffering the disadvantages thereof.

U.S. Pat. No. 4,952,223 states that decreasing column condenser temperature to decrease losses (as is done in this invention) suffers from significant disadvantages. For example, the '223 patent states that in conventional systems the purification column is made of inexpensive carbon steel, which can be used with temperatures as low as −35° F. Stainless steel must be used for temperatures below −35° F., with a significant increase in material cost. However, it has been found that in the invention hereof, surprisingly only the column vent condenser needs to be made of stainless steel.

Figure 6:
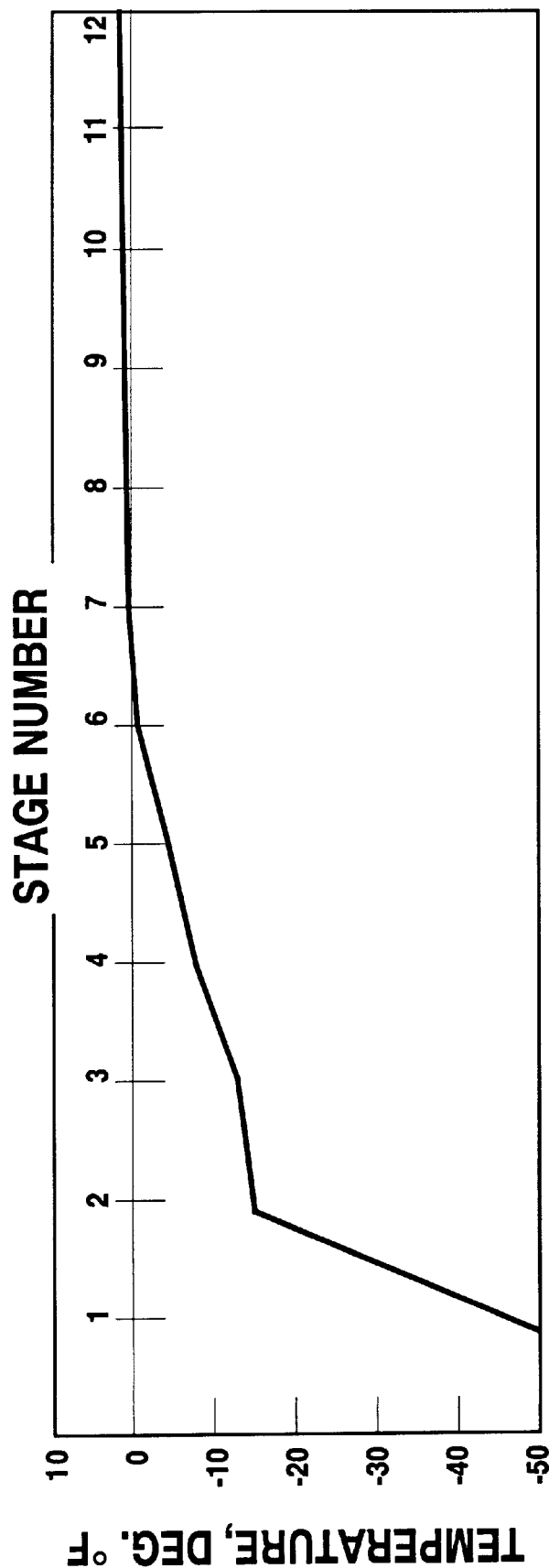
FIG. 6 is a plot of column temperature profile for a $CO_2$ distillation column when operated according to the present invention, as shown in the system of FIG. 4.

FIG. 6 presents a calculated temperature profile in $CO_2$ distillation column 84, when operated according to the present invention. Stage 1 represents the column vent condenser, Stages 2 through 11 are the equilibrium stages in the column itself, and Stage 12 represents the reboiler. The temperature at the first equilibrium stage at the top of the column (Stage 2) is calculated to be only −15° F., and the balance of the column operates at warmer temperatures, allowing the column to be made of carbon steel.

By providing recycled and make-up liquid $CO_2$ at subcooled (−50° F., 300 psig) conditions, rather than at conventional saturated (0° F., 300 psig) conditions, cost savings are achieved by a reduction in required liquid $CO_2$ flow for a given refrigeration demand. For example, the enthalpy difference between saturated liquid $CO_2$ at 0° F. and $CO_2$ vapor at −80° F. (a typical freezer operating temperature) gives a theoretical available refrigeration content of 118.8 BTU/lb of liquid $CO_2$. The corresponding theoretical available refrigeration for subcooled liquid $CO_2$ at −50° F. is 143.3 BTU/lb of liquid $CO_2$. For a fixed refrigeration load in a freezer, the use of subcooled liquid $CO_2$ will achieve a 17.1% decrease in the required flow of liquid $CO_2$. This reduces both the size and cost of the recycle system required and also the amount of make-up merchant liquid $CO_2$ which must be purchased. Both factors result in significant economic savings.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for recovery of $CO_2$ from an inlet feed stream containing a low concentration thereof, comprising the steps of:
    a. compressing said inlet feed stream to a high pressure, and cooling the compressed stream;
    b. applying said feed stream compressed during step a) to a distillation column, wherein said feed stream is converted into a vent gas including $CO_2$ and a high purity bottom liquid $CO_2$;
    c. expanding a portion of said high purity bottom liquid $CO_2$ to achieve a cooled liquid $CO_2$ refrigerant flow; and
    d. condensing $CO_2$ from said vent gas through heat exchange against said cooled liquid $CO_2$ refrigerant and reintroducing said condensed $CO_2$ into said column; and
wherein the remaining portion of said high purity bottom liquid $CO_2$ forms a liquid $CO_2$ product outflow.

2. The method as recited in claim 1, wherein said inlet feed stream is at subambient temperature and step a) first passes said inlet feed stream through a heat exchanger against a compressed flow of said inlet feed stream to cool said compressed flow.

3. The method as recited in claim 1, comprising the added step of:
    e. subcooling said high purity bottom liquid $CO_2$ through heat exchange against said cooled liquid $CO_2$ refrigerant.

4. The method as recited in claim 1, wherein step c. expands a first portion and a second portion of said bottom liquid $CO_2$ to provide a first refrigerant flow and a second refrigerant flow and step d) employs said first refrigerant flow to condense a liquid from said vent gas that is rich in $CO_2$.

5. The method as recited in claim 3, wherein step e. employs said second refrigerant flow to cool said high purity bottom liquid $CO_2$ to provide a subcooled liquid $CO_2$ product outflow.

6. The method as recited in claim 1, comprising the added step of:
    e. recycling flow of said $CO_2$ refrigerant, subsequent to said condensing step d. by subjecting said flow to steps a.–d.

7. The method as recited in claim 3, comprising the added step of:
    f. recycling flow of said $CO_2$ refrigerant, subsequent to said subcooling step e) by subjecting said flow to steps a.–e.

8. The method as recited in claim 2, wherein step a. further heats said inlet feed stream and in so doing, sufficiently raises the temperature thereof to melt ice crystals present therein.

9. The method as recited in claim 1, wherein said inlet feed stream includes a $CO_2$ concentration in a range of about 70% to 100%.

10. The method as recited in claim 1, wherein said inlet feed stream is received from a refrigeration unit and includes a moisture content.

11. The method as recited in claim 10, wherein said liquid $CO_2$ product outflow is fed to said refrigeration unit.

12. The method as recited in claim 1, wherein step a. removes entrained moisture in said compressed flow and accumulates said moisture in an adsorbent, and said method includes the further step of:
    e. subsequent to condensing step d., heating remaining vent gas and feeding said vent gas that has been heated past said adsorbent to remove moisture therefrom.

13. The method as recited in claim 3, wherein the subcooled liquid $CO_2$ product outflow is at a temperature of about −50° F.

14. The method as recited in claim 1, wherein said cooled liquid $CO_2$ refrigerant is at a temperature of about −63° F.

15. The method as recited in claim 1, wherein said cooling in step a) comprises two stages of cooling, and wherein between said cooling stages, said compressed stream is filtered to remove entrained bacteria.

16. The method as recited in claim 3, wherein said high purity bottom liquid $CO_2$ is supplemented with make up high purity liquid $CO_2$ obtained from an independent storage system prior to subcooling.

17. The method of claim 1, further comprising partially condensing $CO_2$ from said vent gas through heat exchange against an ammonia refrigerant immediately prior to step d.

18. The method of claim 3, further comprising partially subcooling said high purity bottom liquid $CO_2$ through heat exchange against an ammonia refrigerant immediately prior to step e.

* * * * *